United States Patent [19]
Shields

[11] 3,799,692
[45] Mar. 26, 1974

[54] ANTI-REVERSE ROTATION STRUCTURE FOR ROTARY GAS COMPRESSORS

[75] Inventor: J. Rodger Shields, Pittsburgh, Pa.

[73] Assignee: Carrier Corporation, Syracuse, N.Y.

[22] Filed: Sept. 22, 1972

[21] Appl. No.: 291,423

[52] U.S. Cl. .............................................. 415/118
[51] Int. Cl. ............................................. F04d 15/02
[58] Field of Search ......... 415/118; 188/82.3, 82.4, 188/82.7

[56] References Cited
UNITED STATES PATENTS

| | | | |
|---|---|---|---|
| 1,663,226 | 3/1928 | Wintroath | 188/82.4 |
| 2,839,071 | 6/1958 | Rosch | 415/118 |
| 3,097,724 | 7/1963 | Bryant et al. | 188/82.7 |
| 3,138,343 | 6/1964 | Henze | 188/82.4 |
| 3,670,855 | 6/1972 | Lemery | 188/82.3 |
| 2,209,466 | 7/1940 | Miller | 415/118 |

*Primary Examiner*—Henry F. Raduazo
*Attorney, Agent, or Firm*—D. Emmett Thompson

[57] ABSTRACT

A toothed ratchet wheel is fixed to the rotor shaft of a rotary gas compressor. A pawl is mounted in the compressor casing for movement into and out of engagement with the teeth of the ratchet wheel. When the pawl is in engagement with the ratchet wheel, it serves to prevent reverse rotation of the compressor shaft. An over the center spring mechanism is associated with the pawl and is operable to yieldingly oppose movement of the pawl from one position to the other. Pressure responsive means may be associated with the pawl and operable upon the application of a predetermined force applied to the pawl resulting from the reverse force of the rotor to actuate an alarm or other device. The pawl may be moved into engagement with the ratchet wheel by manual or automatic means arranged exteriorly of the compressor casing.

4 Claims, 3 Drawing Figures

ANTI-REVERSE ROTATION STRUCTURE FOR ROTARY GAS COMPRESSORS

BACKGROUND OF THE INVENTION

When the driver of a rotary gas compressor is de-energized, the rotor may rotate in reverse direction due to the gas pressure built up in the discharge of the machine This reverse rotation of the rotor may occur with considerable force if the compressor is operating with high pressure output, with the result that the prime mover will be also rotated in reverse direction. The compressor and the prime mover may be damaged by such reverse rotation, especially if the prime mover is a steam turbine. This invention has as an object a mechanism for preventing reverse rotation of the compressor upon shutdown. The mechanism embodies a particularly simple structural arrangement, economical to produce.

SUMMARY OF THE INVENTION

A ratchet wheel is fixed to the rotor shaft and a pawl is provided for movement into and out of engagement with the teeth of the ratchet wheel. When the pawl is moved into engagement with the ratchet wheel, it serves to prevent reverse rotation of the ratchet wheel and rotor shaft. An over the center spring mechanism is provided for yieldingly maintaining the pawl in either engaged or disengaged position. The ratchet wheel teeth are dimensioned such that when the pawl is in engaging position, it is moved to disengaged position upon forward or normal rotation of the rotor. After movement of the pawl to such disengaged position, the teeth of the ratchet do not contact the pawl during normal rotation of the compressor. Accordingly, the ratchet and pawl arrangement is not subject to wear and does not require lubrication.

DESCRIPTION OF THE PREFERRED EMBODIMENT

Figure 3:
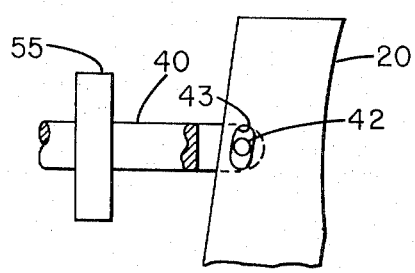
FIG. 3 is an enlarged fragmentary view illustrating the connection between the pawl and the actuating member therefor.

The end section of the compressor casing shown consists of upper and lower sections 10, 11 joined on a horizontally disposed parting line and secured together with bolts 12. A toothed ratchet wheel 13 is fixed to the compressor shaft 14 as by a key 15. In normal operation, the shaft 14 is rotated in a clockwise direction indicated by the arrow 17.

A pawl 20 is pivotally mounted at 21 on a bracket 22 fixed in the lower casing section 11. The pawl 20 is movable about the pivot 21 into and out of engagement with the teeth 25 of the ratchet wheel. The lower end of a helical tension spring 27 is fixed at 29 to a boss 30 formed on the interior of the casing section 11. The upper end of the spring 27 is fixed to the pawl at 31. The spring attachment 31, upon movement of the pawl on the pivot 21, is moved from one side of a vertical plane extending through the pin attachment 29 and the pawl pivot 21 to the opposite side of the plane. Accordingly, this spring serves as an over the center mechanism for yieldingly opposing movement of the pawl from one position to the other.

Figure 1:
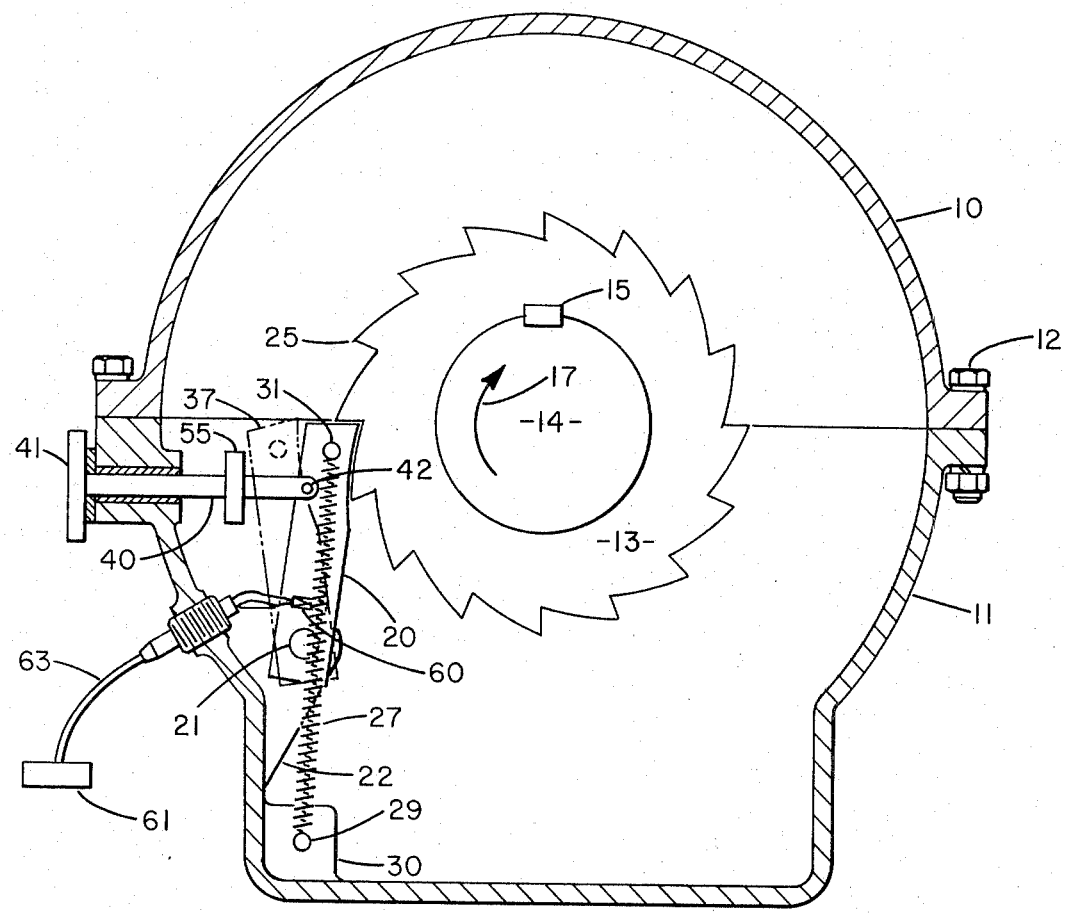
FIG. 1 illustrates the end portion of a rotary gas compressor in section and including the anti-reverse rotation mechanism of my invention.

In FIG. 1, the pawl is shown in tooth engaging position and is yieldingly held in that position by the spring 27. The arrangement is such that upon rotation of the shaft 14 in normal clockwise direction, the teeth 25 of the ratchet wheel will move the spring attaching pin 31 of the engaged pawl outwardly of the vertical plane referred to. The spring 27 will then move the pawl to the dotted line position indicated at 37. Again, in this position, the spring 27 yieldingly opposes inward movement of the pawl.

When the compressor is shut down, the pawl 20 may be moved into tooth engaging position by a stem 40 slidably mounted in the casing section 11, and provided at its outer end with a knob 41. The inner end of the stem 40 is pivotally connected by pin 42 to the pawl 20. The pin extends through an elongated hole 43 in the pawl 20, see FIG. 3. It will be apparent upon inward movement of the stem 40, the pawl is moved in position for engaging the teeth of the ratchet wheel 13.

Figure 2:
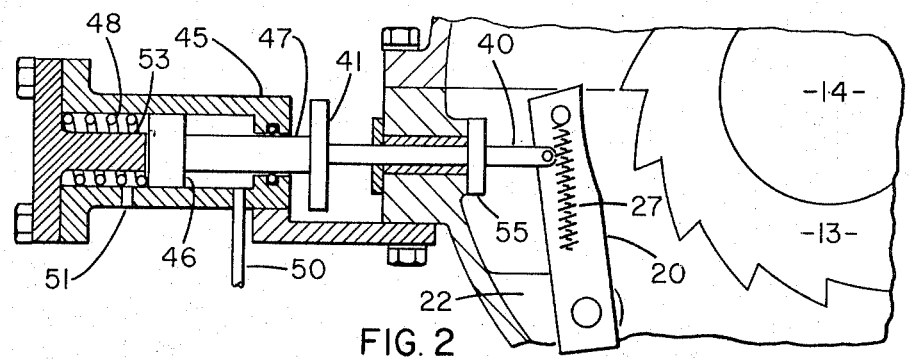
FIG. 2 is a view similar to the left central portion of FIG. 1 and including an oil actuated cylinder structure for moving the pawl into engagement with the ratchet wheel.

The stem 40 may be moved from disengaging position to tooth engaging position by means operable automatically upon the shutdown of the machine. Such actuating means may take the form shown in FIG. 2 of the drawing, consisting of a cylinder 45 mounted exteriorly of the casing. The piston 46 is urged in a direction for engagement of the piston rod 47 with the stem knob 41 by a spring 48. The piston 46 is maintained in the position shown in FIG. 2 by oil pressure supplied to the cylinder through conduit 50. Oil pressure may be supplied to the conduit 50 by the oil lubricating oil pump operated during operation of the machine. When the compressor is shut down, the oil is drained from the cylinder 45, whereupon the spring 48 acts against the piston 46 to move the piston rod 47 against the knob 41, moving the pawl into ratchet wheel tooth engagement. The cylinder 45 is provided with a vent passage 51. A stop 53 is provided to limit outward movement of the piston 46. The knob 41 serves as a stop for inward movement of the stem 40 and pawl 20. A collar 55 fixed to the stem 40 limits outward movement of the stem.

Means is associated with the pawl 20 and is responsive to force of a predetermined level applied to the pawl when the shaft 14 and ratchet wheel 13 are forced in a reverse direction. Upon the application of reverse force, at such level, applied to the pawl the responsive means functions to give an alarm or indication of such force, or to cause the operation of valving to eliminate the high reverse torque on the compressor rotor. This means may consist of a strain gauge 60 connected to a device 61 by conductors 63. The device 61 may be rigged so, when actuated by the strain gauge, it will given an alarm, or operate valving or other structure to relieve the excessive reverse torque on the compressor rotor, tending to effect reverse rotation thereof. U.S. Pat. No. 3,033,031, entitled "TILTING PAD TYPE THRUST BEARINGS HAVING INTEGRAL MEANS FOR MEASURING THRUST LOADS," illustrates a known manner of utilizing strain gauges in structural parts in order to initate alarms indicating excessive force. The strain gauge 60 functions to measure stress resulting from the application of reverse torque on the shaft 14. The torque is generated as a result of reverse gas flow causing the compressor to behave as a turbine. The reverse force applied to the compressor may occur because of a defective check valve in the output line from the compressor or by the malfunction of processing apparatus connected to the compressor, and such reverse force may exist at a dangerous level capable of damaging the compressor. Upon the indication given by the alarm device, the operator can take the necessary steps to relieve the excessive pressure on the compressor.

While I have described the preferred embodiments of my invention, it is to be understood that the invention is not limited thereto, but may be otherwise embodied within the scope of the following claims.

I claim:

1. An anti-reverse rotation structure in combination with a rotary gas compressor having a rotor shaft journaled in a casing and means to prevent reverse rotation of the rotary shaft comprising a toothed ratchet wheel fixed to said rotor shaft, a pawl mounted in said casing and having one end fixedly pivoted to said casing and the opposite end portion movable into engaging and disengaging positions with the teeth of said ratchet wheel, said pawl being operable in tooth engaging position to prevent reverse rotation of said rotor shaft, an over the center spring means connected to said pawl and operable to yieldingly oppose movement thereof from one of said positions to the other, the teeth in said ratchet wheel being operable upon rotation of said shaft in normal direction to move said pawl from engaging to disengaging position and means operative to re-engage said pawl with said ratchet wheel.

2. An anti-reverse rotation structure as set forth in claim 1 and including pressure responsive means operable upon the application of pressure of predetermined value against engaged pawl by said ratchet wheel to actuate an alarm device.

3. A structure as set forth in claim 2 wherein said pressure responsive means is mounted in said pawl.

4. An anti-reverse rotation structure as set forth in claim 1 and including a piston and cylinder assembly operable upon stoppage of said compressor to move said pawl into ratchet wheel tooth engaging position.

* * * * *